(12) United States Patent
St-Laurent et al.

(10) Patent No.: US 11,885,263 B2
(45) Date of Patent: Jan. 30, 2024

(54) SECONDARY AIR SUPPLY SYSTEM WITH FEED PIPE(S) HAVING SONIC ORIFICE(S)

(71) Applicant: PRATT & WHITNEY CANADA CORP., Longueuil (CA)

(72) Inventors: Gabriel St-Laurent, Longueuil (CA); Alain Conrad Martel, St-Paul d'Abbotsford (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/350,705

(22) Filed: Jun. 17, 2021

(65) Prior Publication Data

US 2022/0403777 A1    Dec. 22, 2022

(51) Int. Cl.
*F02C 7/18* (2006.01)
*F01D 9/06* (2006.01)
*F02C 7/04* (2006.01)
*F02C 7/06* (2006.01)

(52) U.S. Cl.
CPC .......... *F02C 7/04* (2013.01); *F02C 7/06* (2013.01); *F02C 7/185* (2013.01); *F05D 2220/323* (2013.01)

(58) Field of Classification Search
CPC ...... F02C 6/06; F02C 6/08; F02C 7/06; F02C 7/12; F02C 7/185; F02C 9/18; F01D 25/18; F01D 25/183; F01D 9/065; F05D 2220/323; F05D 2270/11; F05D 2270/112
See application file for complete search history.

(56) References Cited

U.S. PATENT DOCUMENTS

| | | | |
|---|---|---|---|
| 2,986,231 A | 5/1961 | Hellstrom | |
| 8,307,662 B2 * | 11/2012 | Turco | F01D 5/081 60/785 |
| 8,402,784 B2 * | 3/2013 | Williams | F28F 13/125 62/401 |
| 9,279,341 B2 | 3/2016 | Durocher et al. | |
| 9,771,865 B2 | 9/2017 | Merchant et al. | |
| 10,024,242 B2 * | 7/2018 | Goulds | F02C 7/18 |
| 10,100,730 B2 * | 10/2018 | Huppe | F02C 7/18 |
| 10,132,246 B2 * | 11/2018 | Lior | F02C 9/18 |
| 10,167,734 B2 * | 1/2019 | Sonokawa | F01D 25/162 |
| 10,253,632 B2 | 4/2019 | Lyons | |
| 10,443,498 B2 * | 10/2019 | Mosley | F01D 25/12 |
| 10,781,705 B2 | 9/2020 | Nichols et al. | |

(Continued)

*Primary Examiner* — Andrew H Nguyen
*Assistant Examiner* — Sean V Meiller
(74) *Attorney, Agent, or Firm* — NORTON ROSE FULBRIGHT CANADA LLP

(57) ABSTRACT

A secondary air system (SAS) of an aircraft engine that produces secondary airflow from a source of secondary air includes a hollow strut and one or more SAS feed pipes upstream thereof. The hollow strut extends radially through the main gas path of the engine and defines therein a strut conduit extending between a strut inlet and a strut outlet at opposite ends of the hollow strut. The strut outlet is in fluid flow communication with a buffer cavity for feeding the secondary airflow to the engine core. The SAS feed pipe includes an inlet receiving the secondary airflow from the source of secondary air, and an outlet in fluid flow communication with the strut inlet to feed the secondary airflow into the strut conduit. The SAS feed pipe has a sonic orifice therein, between the inlet and the outlet thereof.

17 Claims, 6 Drawing Sheets

(56) References Cited

U.S. PATENT DOCUMENTS

| | | | | |
|---|---|---|---|---|
| 2006/0196192 A1* | 9/2006 | Richards | ............... | F02C 9/18 |
| | | | | 60/785 |
| 2012/0156005 A1* | 6/2012 | Nielsen | ............... | F04B 39/045 |
| | | | | 417/286 |
| 2016/0265432 A1 | 9/2016 | Huppe et al. | | |
| 2016/0312615 A1 | 10/2016 | Yons | | |

* cited by examiner

SECONDARY AIR SUPPLY SYSTEM WITH FEED PIPE(S) HAVING SONIC ORIFICE(S)

TECHNICAL FIELD

The application relates generally to secondary air systems in aircraft engines.

BACKGROUND

Aircraft engines, such as gas turbine engines, use secondary air systems to provide air to the engine for non-combustion purposes, for example for internal engine cooling, sealing bearing cavities, etc. This non-combustion air therefore needs to be fed across the main gas path to the engine shafts and bearing cavities within the inner core of the engine. In certain engine configurations, a hollow strut is used as a conduit for the secondary airflow. This hollow strut is typically relatively large and airfoil shaped, and bridges from the outer casing of the main gas path to an inner surface of the main gas path, thereby providing support and also allowing the non-combustion secondary air to be routed through the interior of the strut to the inner core of the engine (and thus to bearing cavities, etc.).

While such secondary air systems and their associated structures and/or architecture are suitable for their intended purposes, continuous improvement is always sought. Amongst other things, there is a desire to be able to increase the supply capacity of the secondary airflow, should the need arise, while limiting the secondary airflow at high power engine conditions.

SUMMARY

In one aspect, there is provided a secondary air system (SAS) of an aircraft engine having a main gas path extending through an engine core, the aircraft engine producing secondary airflow from a source of secondary air, the SAS comprising: a hollow strut extending radially through the main gas path, the hollow strut defining therein a strut conduit extending between a strut inlet and a strut outlet at opposite ends of the hollow strut, the strut outlet in fluid flow communication with a buffer cavity for feeding the secondary airflow to the engine core; and a SAS feed pipe having an inlet receiving the secondary airflow from the source of secondary air, and an outlet in fluid flow communication with the strut inlet to feed the secondary airflow into the strut conduit, the SAS feed pipe having a sonic orifice therein between the inlet and the outlet thereof.

The SAS as defined above and herein may further include, in whole or in part, and in any combination, one or more of the following features.

In certain embodiments, the SAS feed pipe includes two or more SAS feed pipes each receiving the secondary airflow from the source of secondary air and respectively defining therein a secondary air stream flowing in parallel, and each of the SAS feed pipes includes one of said sonic orifice therein between the inlet and the outlet thereof.

In certain embodiments, the hollow strut includes two or more hollow struts, the inlet of each of the two or more hollow struts being in fluid flow communication with the outlet of a respective one of the two or more SAS feed pipes.

In certain embodiments, the hollow strut includes two or more hollow struts, the strut inlet being in fluid flow commination with the outlets of the two or more SAS feed pipes.

In certain embodiments, the sonic orifice is shaped to create a first flow restriction in the SAS feed pipe when the aircraft engine is operating at a first power running regime, and the sonic orifice is shaped to create a second flow restriction in the SAS feed pipe when the aircraft engine is operating at a second power running regime, the second power running regime being less than the first power running regime, and the second flow restriction being less than the first flow restriction.

In certain embodiments, the sonic orifices includes a converging-diverging nozzle.

In certain embodiments, the converging-diverging nozzle includes a converging inlet portion, a diverging outlet portion and a throat between the converging inlet portion and the diverging outlet portion, the converging inlet portion having a shorter axial length than the diverging outlet portion.

In certain embodiments, the buffer cavity is located radially inwardly of the main gas path.

In certain embodiments, the outlet of the SAS feed pipe is located radially outwardly of the main gas path.

In certain embodiments, an inter-compressor case of the aircraft engine includes the hollow strut.

In certain embodiments, the SAS feed pipe includes a flexible hose portion at an upstream end thereof and a rigid pipe portion at a downstream end thereof, the sonic orifice located in the rigid pipe portion.

In certain embodiments, the buffer cavity is in fluid communication with one or more bearing cavities and/or seals within the engine core, to feed secondary air from the buffer cavity to the one or more bearing cavities and/or seals within the engine core.

In certain embodiments, the aircraft engine is a turbofan gas turbine engine, and the source of secondary air includes bypass duct air from a bypass duct of the turbofan gas turbine engine.

In certain embodiments, a bypass air cooler (BAC) is located within the bypass duct and provides the source of secondary air for the SAS.

In certain embodiments, a flow splitter having an inlet is in fluid flow communication with the source of secondary air and at least two outlets, each of the two outlets being in fluid flow communication with a respective one of the inlets of the two or more SAS feed pipes.

In certain embodiments, the inlet of each of the two or more SAS feed pipes is in fluid flow communication with the source of secondary air.

In certain embodiments, the source of secondary air includes two or more sources of secondary air, the secondary air streams flowing in parallel through the two or more SAS feed pipes being respectively fed from different ones of the two or more sources of secondary air.

In another aspect, there is provided a method of operating an aircraft engine having a secondary air system (SAS), the method comprising: receiving a secondary airflow from a source provided by the aircraft engine, the secondary airflow including one or more air streams flowing downstream of the source; flowing each of the one or more secondary air streams through a respective SAS feed pipe, wherein an outlet of the SAS feed pipe is in fluid communication with a buffer cavity that receives therein the one or more secondary air streams therein; and generating a first flow restriction in each of the secondary air streams during a first power regime of the aircraft engine, and generating a second flow restriction in the secondary air streams during a second power regime of the engine, the second power regime being lower than the first power regime, and the second flow restriction being less than the first flow restriction.

The method as defined above and herein may further include, in whole or in part, and in any combination, one or more of the following features and/or steps.

In certain embodiments, generating includes using sonic orifices located in each said SAS feed pipe.

In certain embodiments, the method further includes, downstream of the SAS feed pipe, flowing each of the secondary air streams through a respective hollow strut, wherein outlets of the hollow struts are in fluid communication with the buffer cavity.

BRIEF DESCRIPTION OF THE DRAWINGS

Reference is now made to the accompanying figures in which.

DETAILED DESCRIPTION

Figure 1:
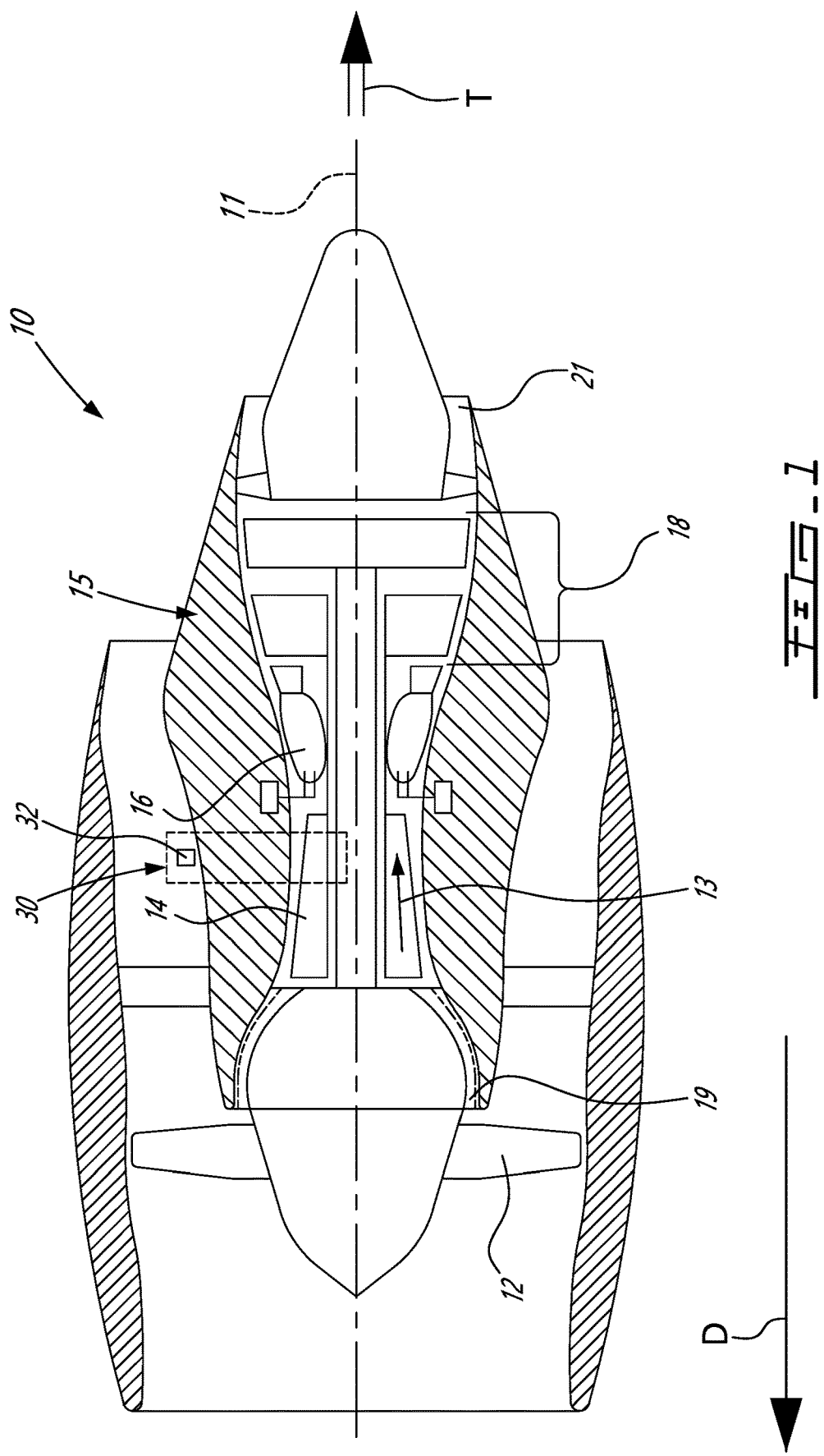
FIG. 1 is a schematic cross sectional view of an aircraft engine.

FIG. 1 illustrates an aircraft engine 10 (or simply "engine" 10), which in this case is a gas turbine engine of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. engine 10 has a longitudinal center axis 11.

The engine 10 depicted in FIG. 1 is a turbofan engine, and therefore includes a bypass duct 20 that surrounds a core 15 of the engine, the engine core 15 including for example the compressor section 14, the combustor 16 and the turbine section 18. The fan 12 propels air through both the central engine core 15 and through the radially outer bypass duct 20. However, it is to be understood that the present disclosure may also be applicable to other types of gas turbine engines, including turboshafts and turboprops for example. Indeed, the present disclosure may also be applicable to other types of airborne aircraft engines which have a secondary air system, whether or not they are traditional gas turbine engines. For example, the present SAS system may also be used in hybrid, alternate fuel and/or electric aircraft engines, provided that they include a secondary air system.

The engine 10 defines a main gas path 13 of combustion gasses flowing through the engine core 15. The exemplified engine 10 shown is a "through-flow" type gas turbine engine, in which gases flow through the central core 15 of the engine from the air inlet 19 located at the forward end of the engine to the exhaust 21 located at the rearward (aft) end of the engine 10. In the depicted embodiment, this direction of airflow along the main gas path 13 and through the core 15 of the engine 10 is generally in a direction opposite to the direction of travel D of the aircraft, in that the thrust T produced by the engine 10 in the aft direction propels the aircraft forward in the direction D.

However, the features of the secondary air system (SAS) 30 as described herein are similarly applicable to a "reverse-flow" turboprop or turboshaft engine, for example, wherein gases flow through the core of the engine from an inlet located at or near the rear (aft) end of the engine to the exhaust outlet located at a forward end (i.e. relative to the direction of travel of the aircraft) of the engine. In such a reverse flow engine configuration, the direction of airflow through the core of the engine is therefore generally in the same direction as the direction of travel of the aircraft.

It will be appreciated that the expressions "forward" and "aft" used herein refer to the relative disposition of components of the engine 10, in correspondence to the "forward" and "aft" directions of the engine 10 and an aircraft including the engine 10 as defined with respect to the direction of travel D of the aircraft. In the embodiment shown in FIG. 1, a component of the engine 10 that is "forward" of another component is arranged within the engine 10 such that it is located closer to the fan 12. Similarly, a component of the engine 10 that is "aft" of another component is arranged within the engine 10 such that it is further away from the fan 12. Similarly, unless indicated otherwise, the expressions "upstream" and "downstream" as used herein refer to similar relative axial dispositions of components of the engine relative to the direction of the main gas path 13 through the engine, from the air inlet 19 to the exhaust 21.

The engine 10 includes a secondary air system (SAS) 30 to provide compressed air to the engine for non-combustion purposes, for example for example for internal engine cooling, sealing bearing cavities, feeding pneumatic systems, de-icing, meeting environmental control system requirements of the aircraft, etc. This compressed air used for non-combustion purposes will be referred to herein as "secondary airflow" or "secondary air". The SAS 30 is accordingly operable to bleed, distribute, handle and/or regulate the secondary air flow to and/or for one or more of such non-combustive air flow systems.

Depending on the engine configuration, the source of this secondary air distributed by the SAS 30 may include air bled off from the compressor section 14 of the engine 10 or air bled off from the bypass airflow flowing through the bypass duct 20 of the engine 10 (in the case of a turbofan engine, as depicted). For air bled from the compressor section, secondary air used for internal engine cooling and bearing cavity sealing may be bled from, for example, one or more locations near a high pressure compressor of the compressor section 14. For example, compressor bleed air may be extract from a location downstream from the outlet of the high pressure compressor (i.e. air from station 3 station of the engine, or "P3" air) and/or from a location upstream of the inlet of the high pressure compressor (i.e. air from station 2.5 of the engine, or "P2.5" air).

In the case of the turbofan engine 10 of FIG. 1, the source of the secondary air for the SAS 30 may include bypass air which is withdrawn or bled from the outer bypass duct 20 of the engine 10. Any suitable port or take-off may be used to direct the bypass air into the SAS 30. In one particular embodiment, the bypass air may be initially cooled by a bypass air cooler (BAC) 32, located for example in the bypass duct 20, before being directed into the SAS 30 and thus providing the secondary airflow.

Figure 2:
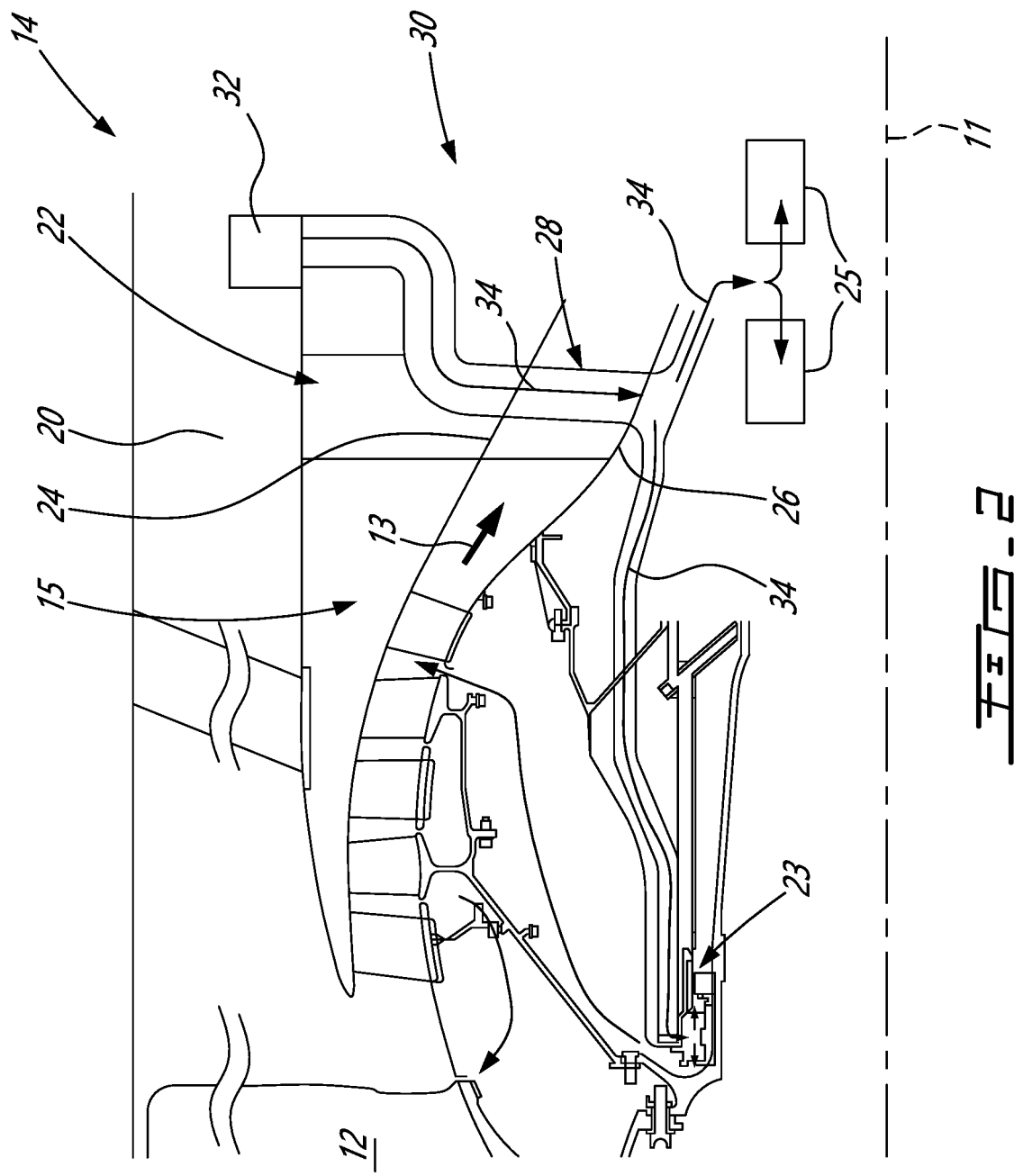
FIG. 2 is a cross-sectional view of a compression section of the engine of FIG. 1, partially showing secondary airflow of a secondary air system (SAS) of the engine.

Referring to FIG. 2, the compressor section 14 of the engine 10 may include an inter-compressor case (ICC) 22 within which certain elements of the SAS 30 as described herein may be integrated. Although the SAS 30 is described below in the context of the compressor 14 of the engine 10, it is to be understood that the present SAS 30 can also be used elsewhere within the engine 10, for example within the turbine section 18. The ICC 22 includes generally a radially outer casing 24 and a radially inner casing 26 that are radially spaced apart, relative to the longitudinal central axis 11 of the engine 10. In the depicted embodiment, at least two struts 28 extend radially between the radially inner and outer casings 24, 26 of the ICC 22. The struts 28 are hollow and therefore form conduits which define secondary air flow paths 34 radially through the struts. In at least the depicted embodiment, the secondary air flowing along the secondary air flow paths 34 flows radially inwardly through the struts 28, that is from a radially outer end to a radially inner end of each of the struts 28. From the radially inner end of each strut 28 (i.e. the outlet of the secondary air), the secondary airflow is direction along paths 34 to feed the secondary air to seals 23 and/or bearing cavities 25 within the inner core of the engine, proximate the main engine shafts. In alternate embodiments and engine configurations, however, it is understood that the secondary air may also and/or instead flow radially outwardly through the struts 28 of the ICC 22. The external surfaces of the struts 28 may be airfoil shaped, given that these struts 28 extend through the main gas path of the compressor section 14. The struts 28 may also provide structural support for bearing housings or bearing cavities 25 and/or other components located radially inward of the main gaspath 13 and/or for the outer casing 24 of the ICC 22 located radially outward of the main gaspath. The ICC 22 may also define a portion of the inner wall of the outer bypass duct 20, which is disposed radially outward from the ICC 22 and the engine core 15.

As mentioned above, in certain prior art engine configurations, a single, large, hollow strut is typically used as a conduit for the secondary airflow, wherein compressed air is directed through a single hollow strut that passes through the main gas path of the engine in order to feed compressed secondary air to the inner core of the engine. However, using a single strut to supply the secondary airflow may leave little margin for increasing the supply capacity of the secondary air, should the need arise. This can be alleviated, as per the present disclosure, by providing one or more flow paths, which may include using multiple struts instead of a single one, and limiting the flow within each of these flow paths using sonic orifices to control the flow therethrough. The need to limit the flow is driven by the air system supply requirements, particularly at high power operating regime when excess flow consumption may otherwise have detrimental effect on the performance of the engine. However, if other types of control orifices (i.e. not sonic orifices, as described herein) are used as means to limit the secondary flow, they could further decrease the amount of air supply available at low power regime, when typically the largest amount of flow possible is desired.

Figure 3:
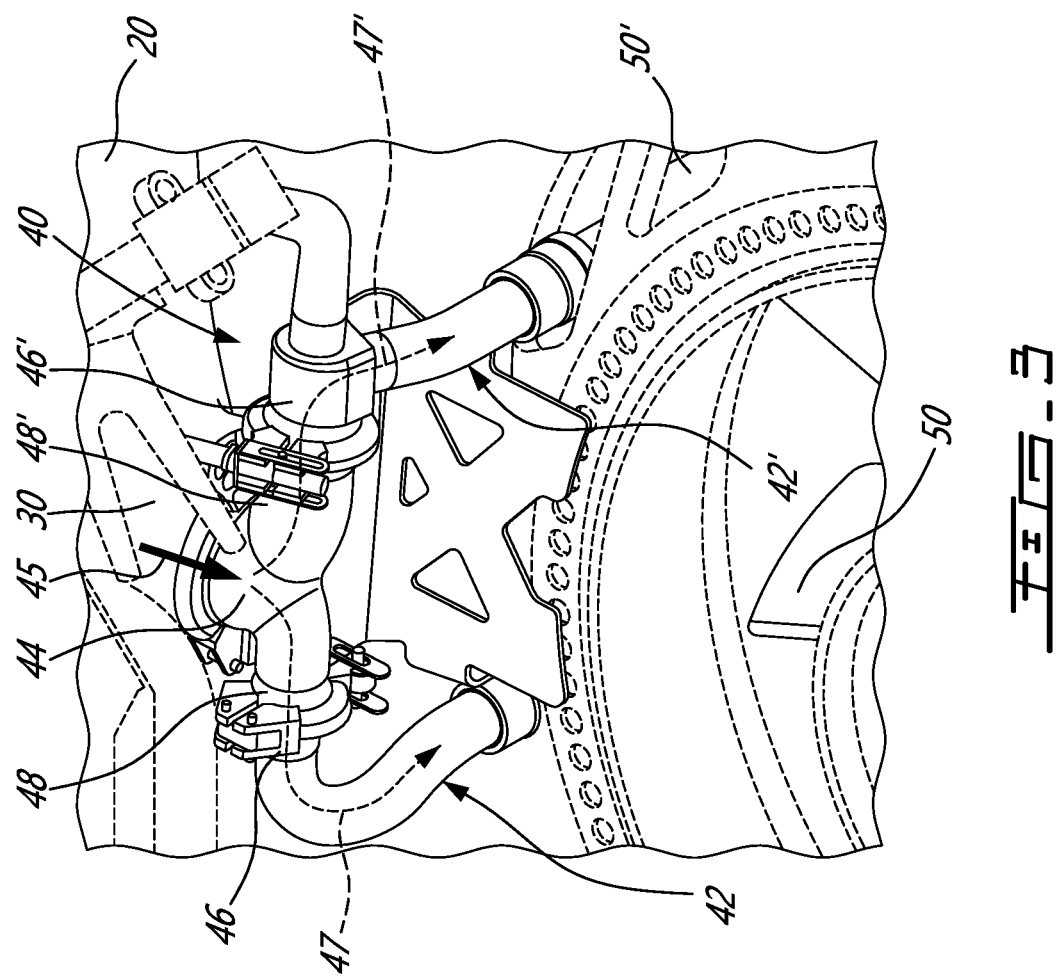
FIG. 3 is a perspective view of the SAS of the engine of FIGS. 1-2, showing SAS feed pipes of the SAS.

Referring now to FIG. 3, the SAS 30 of the present disclosure accordingly includes a SAS feed pipe configuration 40, which includes, in at least one particular embodiment, two or more separate SAS feed pipes, such as the two SAS feed pipes 42, 42' as will be explained below, for feeding the secondary air from the secondary air source into the inner core 15 of the engine 10, via a corresponding number of hollow struts 28. Additionally, as will also be explained in more detail below with reference to FIG. 4, each of the SAS feed pipes 42 includes a sonic orifice 60 therein.

Although the SAS 30 will be described below with general reference to an embodiment wherein two SAS feed pipes 42, 42' are provided, it is to be understood that in another possible embodiment, a single SAS feed pipe 42 may be used, or alternately still more than two SAS feed pipes may be provided. Therefore, although in the depicted embodiment the SAS feed-pipe configuration 40 of the SAS 30 is a twin-pipe configuration, in that there are two SAS feed pipes 42, 42', it is to be understood that a single feed pipe 42 or more than two of the SAS feed pipes 42, 42' may also be provided. Regardless of the number of SAS feed pipes, however, each of the SAS feed pipes will include a sonic orifice 60 therein, as described below. Accordingly, any number of parallel flow paths 47, 47' (formed by the SAS feed pipes 42, 42' and their respective hollow struts 28) may be provided, and can be selected depending on the flow demands of the particular engine 10 and/or the geometry and space envelope available. In the case of a single SAS feed pipe 42, it may feed either a single corresponding hollow strut 28 or alternately a single SAS feed pipe 42 may feed secondary air to multiple (two or more) hollow struts 28.

As seen in FIG. 3, in the depicted embodiment, incoming secondary air flow 45 received from the secondary air source, which in this case is the BAC 32 in the outer bypass duct 20, is split into two separate streams by a Y-junction or flow splitter 44. According the incoming secondary air flow 45 from the source is split into a first secondary air stream 47 and a second secondary air stream 47' by the flow splitter 44, such that downstream of the flow splitter 44 the first and second secondary air streams 47, 47' flow through separate conduits. More particularly, as noted above, the feed-pipe configuration 40 of the SAS 30 includes a first SAS feed pipe 42 and, in the present embodiment, at least a second SAS feed pipe 42'. The first SAS feed pipe 42 has an inlet 46 that is connected in fluid flow communication to a first outlet 48 of the flow splitter 44, and the second SAS feed pipe 42' has an inlet 46' that is connected in fluid flow communication to a second outlet 48' of the flow splitter 44. As such, the first SAS feed pipe 42 contains and defines the first secondary air stream 47 and the second SAS feed pipe 42' contains and defines the second secondary air stream 47', both flowing through discrete conduits downstream of the flow splitter 44.

In an alternate embodiment, however, the SAS may not include the flow splitter 44, and instead each of the SAS feed pipes 42, 42' may be fed directly from either the same pressurized air source or from separate pressurized air sources. For example, each of the SAS feed pipes 42, 42' can be directly connected to the BAC 32 and/or the bypass duct 20, with each having its own bleed or take-off port feeding bypass duct air into the two SAS feed pipes 42, 42'.

Figure 5:
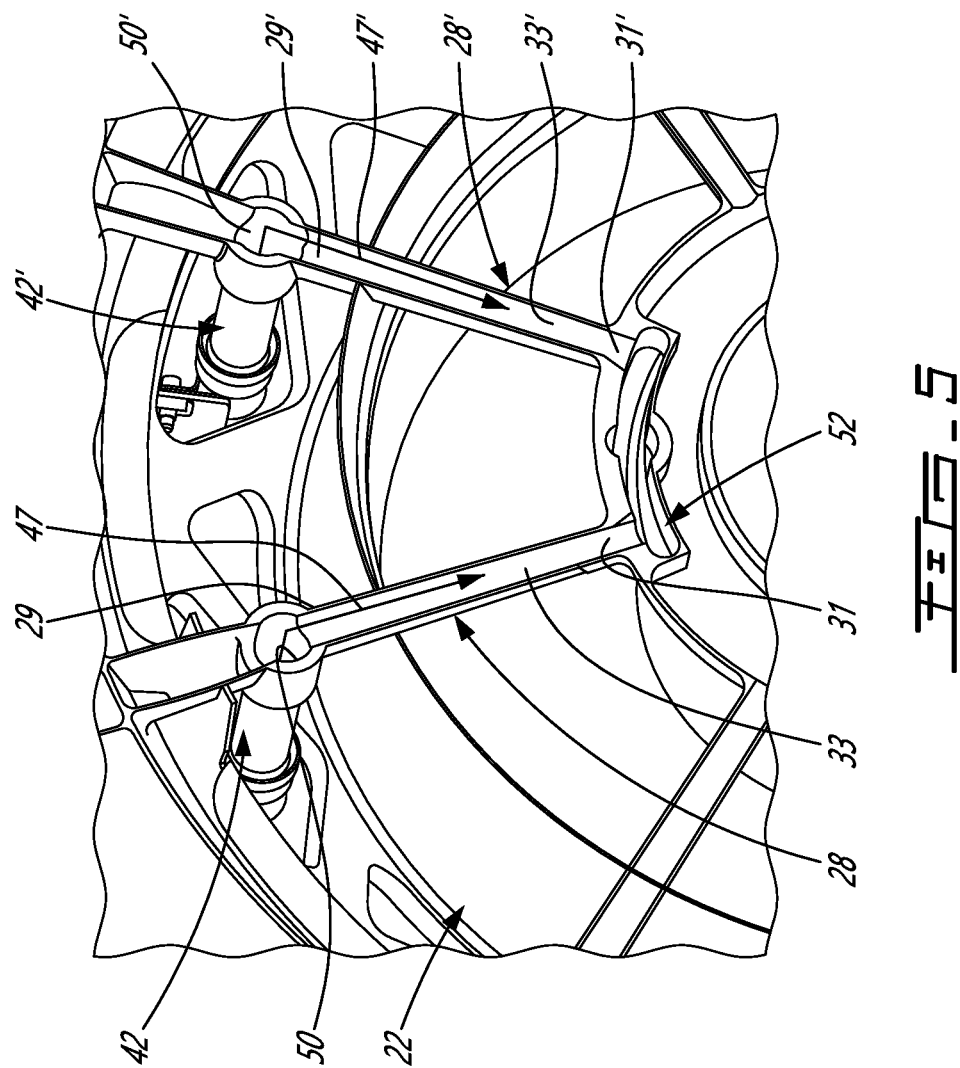
FIG. 5 is a partially sectioned rear perspective view of the secondary air system of FIGS. 3-4, showing secondary airflow through the struts of the inter-compressor case.

As best seen in FIG. 5, the first and second SAS feed pipes 42, 42' have outlets 50, 50' which are connected in fluid flow communication with different hollow struts 28 of the ICC 22. More particularly, the first SAS feed pipe 42 has an outlet 50 which is connected in fluid flow communication with an inlet 29 of a first strut conduit extending 33 through a first strut 28 and the second SAS feed pipe 42' has an outlet 50' that is connected in fluid flow communication with an inlet 29' of a second strut conduit 33' extending through a second strut 28', whereby the first secondary air stream 47 is fed into the first strut conduit 33 of the first strut 28 by the first SAS feed pipe 42 and the second secondary air stream 47' is fed into the second strut conduit 33' of the second strut 28' by the second SAS feed pipe 42. In the depicted embodiment, the inlets 29, 29' of the first and second struts 28, 28' are located at their radially outer ends, such that the first and second secondary air streams 47, 47' flow through the first and second strut conduits 33, 33' of the hollow struts 28, 28' in a radially inward direction toward the center core 15 of the engine 10.

Referring still to FIG. 5, the hollow struts 28, 28' have respective outlets 31, 31' at their downstream ends (with respect to the direction of the secondary air flow through the struts). The downstream ends of the hollow struts 28, 28', which in the depicted embodiment are the radially inner ends of the struts, are connected in fluid flow communication with a single, common plenum in the form of a buffer cavity 52. In the depicted embodiment, the buffer cavity 52 is arcuate and extends partially circumferentially within the radially inner casing 26 of the ICC 22 such as to fluidly interconnect the two outlets 31, 31' of the inner conduits of the two hollow struts 28, 28'. This buffer cavity 52 is accordingly located under, that is radially inward of, the main gas path 13 through the engine core 15. The first and second secondary air streams 47, 47', which respectively flow through the first and second SAS feed pipes 42, 42' and the first and second hollow struts 28, 28', accordingly reunite at the buffer cavity 52.

From the buffer cavity 52, the re-united secondary air is fed downstream (relative to the flow of secondary air) to the bearing cavities 25 and/or seals 23 of the engine core 15 along secondary flow paths 34 as shown in FIG. 2.

Figure 4:
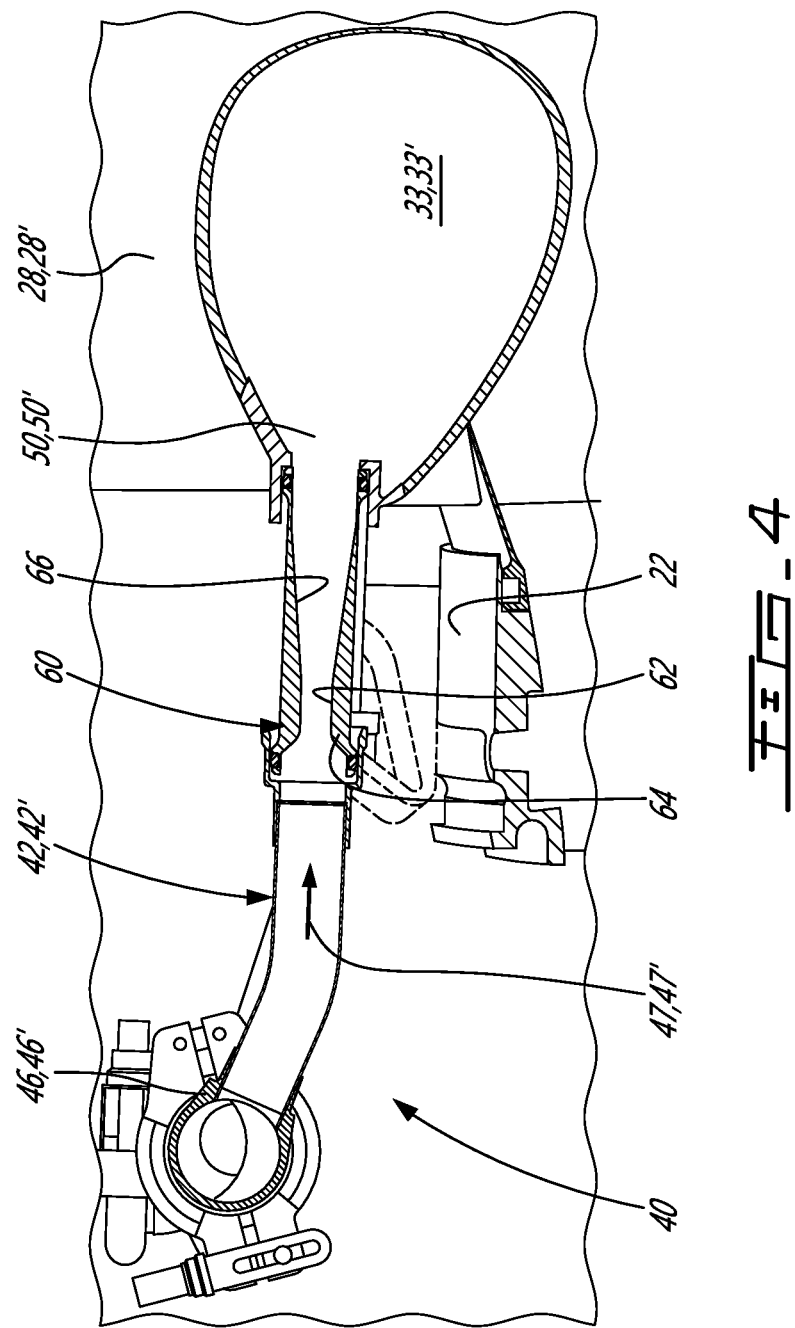
FIG. 4 is a cross-sectional view taken through one of the SAS feed pipes in FIG. 3.

Referring now back to FIG. 4, each of the two SAS feed pipes 42, 42' includes a sonic orifice 60 therein, located between the inlets 46, 46' and the outlets 50, 50' of the pipes 42, 42'. The sonic orifices 60 are static and have no moving parts, but effectively provide a different flow restriction at various engine operating conditions, such that the secondary air flow through the SAS feed pipes 42, 42' can be more restricted at higher secondary air flow rates but less restricted at lower secondary air flow rates.

The sonic orifices 60 are accordingly operable to create a flow restriction when the engine 10 is operating at high power and/or high engine speed, such as during take-off, flight cruise, etc. More particularly, at such high power engine regimes when flow rates of the secondary air flow through the SAS feed pipes 42, 42' is relatively high, the sonic orifices 60 lead to a compressibility-driven restriction at the throats 62 within the orifices 60. Thus, flow is limited due to choking of the flow.

However, when the engine 10 is operating at lower power and/or speed, such as at engine idle for example, when the flow rates of the secondary air flow are relatively lower, the secondary air flow through the SAS feed pipes 42, 42' is less restricted (in comparison with the degree or amount of restriction created at higher flow rates, as noted above). At low secondary air flow rates, which may occur during engine idle for example, significantly reduced flow restriction is therefore provided by the sonic orifices 60 and, thus, the secondary airflow can be maximized at low engine lower. The flow restrictions provided by the sonic orifices 60 at high engine power however help to constrain the secondary air flow at such high engine power regimes to prevent excessive quantities of secondary airflow or secondary airflow having too high a pressure to be fed to the engine core 15 for sealing and/or cooling purposes during high engine power regimes. Thus, for a given air flow supply or specific fuel consumption (SFC) of the engine 10 running at high power, the shape of the sonic orifices 60 maximizes secondary air flow at engine idle (e.g. low power) when bearing cavity pressurization needs it the most. Stated differently, the sonic orifices 60 offer reduced flow restriction penalty at low engine speeds (e.g. at engine idle), while still providing flow restriction at the throats of the sonic orifices 60 at high power (because the air flow is choked by the sonic orifice thereby causing a compressibility-driven restriction.

The sonic orifices 60 can be tailored to have negligible flow restriction at low power (to promote greater air-supply) and to restrict the secondary air flow at higher engine power regimes, and this can be selected and/or tailored depending upon the secondary air requirements of the particular engine.

Accordingly, the sonic orifices 60 are operable to limit the secondary airflow at high engine power, relative to what would otherwise be possible (i.e. if other components, such as struts, etc. were to act as flow restrictors). Stated differently, the sonic orifices 60 are selected such as to act as the dominant flow restriction/limitation within the secondary airflow path between the source and the buffer cavity. The quantity of parallel flow paths defined by the SAS feed pipes and their respective hollow struts downstream thereof is selected as required, and may be dependent upon a total SAS secondary airflow demand and/or restriction of existing passages either upstream of downstream of the SAS feed pipes. The quantity of parallel paths may thus increase with engine flow demand and may be reduced with available passage sizes. For example, in a particular embodiment, it may be possible to use a single flow path—i.e. a single SAS feed pipe 42—if it is sufficient to meet the secondary airflow demands of the engine when operating a low engine power. In all cases, however, and in each parallel path, the sonic orifice 60 is the dominant restrictor at high power, while not unduly limiting secondary airflow at lower powers—when the mass flow and/or pressure of the secondary airflow is lower.

As seen in FIG. 4, the sonic orifices 60 may be formed by converging-diverging nozzles. More particularly, in the embodiment depicted in FIG. 4, the converging portion 64 the converging-diverging nozzle is shorter in axial length (i.e. in the direction of flow 47, 47') than the longer diverging portion 66 of the converging-diverging nozzle.

In an alternate embodiment, the sonic orifices 60 may include and/or be replaced with flat plate orifices or other suitable and similar flow restrictors. However, such flat plate orifices may offer less advantages, as there would be less flow supply at idle and therefore the flow restriction provided by such flat-plate orifices may be substantially uniform regardless of the flow rates. From a flow supply perspective, therefore, using sonic orifices 60 (comprising converging-diverging nozzles for example) offers a more optimal solution because the secondary airflow is restricted less at low power regimes (flow rates) and more at higher power regimes (flow rates)

As can be see in FIGS. 3-4, each of the two SAS feed pipes 42, 42' may, in one particular embodiment, include a first flexible hose portion 70 at an upstream end (relative to the flow of secondary air therethrough) of the SAS feed pipe 42, 42' and a second rigid pipe portion 72 at a downstream end ((relative to the flow of secondary air therethrough) of the SAS feed pipe 42, 42'. The sonic orifice 60 may, as shown in the depicted embodiment, be located within the second rigid pipe portion 72 of the SAS feed pipe 42, 42'. More particularly still, the sonic orifice 60 may be located at the most upstream end of the second rigid pipe portion 72, proximate the junction between the first flexible hose portion 70 and the second rigid pipe portion 72. The use of the first flexible hose portions 70 may enable the SAS feed pipes 42, 42' to be supported by, or routed-through, existing engine hardware.

The secondary air system (SAS) 30 as described herein therefore uses a feed-pipe configuration 40 (which in a particular embodiment is a multi-pipe configuration composed of two or more SAS feed pipes) for feeding the SAS air into the engine core 15, with sonic orifices 60 provided between the inlets 46, 46' and the outlets 50, 50' of each of the SAS feed pipes 42, 42'.

Although the concepts described herein with respect to the SAS feed pipes 42, 42' are done in the context of the SAS 30 in general, and the secondary air inlet feed to the engine core 15 in particular, it is to be understood that twin pipe configuration 40 having the sonic orifices 60 therein may be extended and/or applied to other feeder pipes within the engine 10, including but not limited to other secondary air flow passages—for example those in the turbine section of the engine, or elsewhere.

Figure 6:
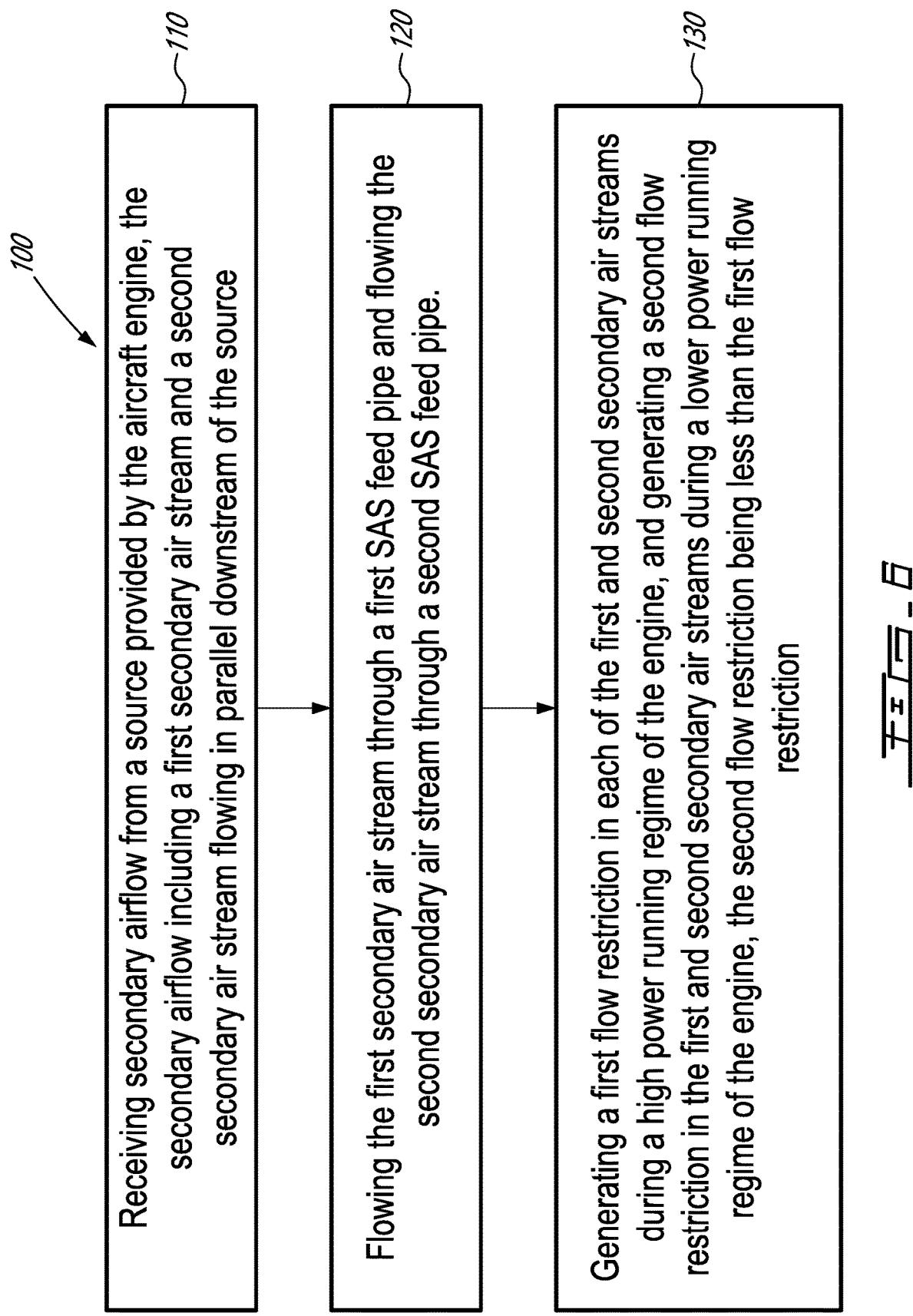
FIG. 6 is a flow diagram illustrating steps of operating an aircraft engine of FIG. 1 having the SAS of FIGS. 2-5.

With reference to FIG. 6 and further to the embodiments described above, a method 100 of operating the gas turbine engine 10 having the SAS 30 as described herein may also include, generally, the steps of: receiving, at 110, secondary airflow from a source provided by the aircraft engine, the secondary airflow including one or more secondary air streams flowing downstream of the source; flowing, at 120, each of the secondary air streams through a respective SAS feed pipe, wherein an outlet of the SAS feed pipe is in fluid communication with a buffer cavity that receives therein the secondary air streams therein; and generating, at 130, a first flow restriction in each of the secondary air streams during a first (high) power regime of the engine, and generating a second flow restriction in the secondary air streams during a second (lower) power regime of the engine, the second power regime being lower than the first power regime, and the second flow restriction being less than the first flow restriction.

The step 130 of generating may further comprise, in certain embodiments, using sonic orifices located in each of the SAS pipes to generate the first and second flow restrictions. The method 100 may also further comprises, downstream of the SAS feed pipes, flowing the secondary air streams through a respective hollow strut, wherein outlets of the hollow struts are in fluid communication with the buffer cavity.

The embodiments described in this document provide non-limiting examples of possible implementations of the present technology. Upon review of the present disclosure, a person of ordinary skill in the art will recognize that changes may be made to the embodiments described herein without departing from the scope of the present technology, in addition to the various alternatives described herein above. For example, and as described above, the described system and method can use any number of SAS feed pipes each feeding a respective air stream therethrough. In the case of two or more SAS feed pipes, each feeds a parallel air stream therethrough and each may, in certain embodiments, feed a respective hollow strut downstream of each of the SAS feed pipes (relative to the secondary airflow). Additionally, although one embodiment described uses bypass air as the source of the non-combustion air for the SAS, wherein the bypass air may be initially cooled by the BAC 32 and subsequently fed to the inner bearing cavities of the engine core 15, alternate engine architectures may not require the air to pass through a BAC 32 or be bled from the bypass duct, and thus may enable other sources for the secondary air for the SAS 30. Additionally, different slot clockings (i.e. circumferential alignments) and/or different sonic orifice sizes can be used, depending on the particular engine. In certain other alternate embodiments, the secondary air may flows through the hollow struts in the opposite direction, i.e. from radially inner ends to radially outer ends thereof. Yet further modifications could be implemented by a person of ordinary skill in the art in view of the present disclosure, which modifications would be within the scope of the present technology.

The invention claimed is:

1. A secondary air system (SAS) of an aircraft engine having a main gas path extending through an engine core, a central axis of the aircraft engine extending through the engine core, the aircraft engine producing secondary airflow from a source of secondary air, the SAS comprising: two or more hollow struts extending radially through the main gas path and forming part of an inter-compressor case of the aircraft engine, each of the two or more hollow struts defining therein a strut conduit extending between a strut inlet and a strut outlet at opposite ends of the hollow strut, the strut outlet in fluid flow communication with a buffer cavity for feeding the secondary airflow to the engine core, the buffer cavity formed by a plenum axially aligned with the two or more hollow struts and defined within the inter-compressor case, the buffer cavity extending partially circumferentially within the inter-compressor case to interconnect the strut outlets of the two or more hollow struts, the buffer cavity extending around the central axis from a first end positioned at a strut outlet of a first hollow strut of the two or more hollow struts, to a second end positioned at a strut outlet of a second hollow strut of the two or more hollow struts circumferentially offset from the first end, a portion of a circumference of the inter-compressor case devoid of the buffer cavity; and a SAS feed pipe having an inlet receiving the secondary airflow from the source of secondary air, and an outlet in fluid flow communication with the strut inlet to feed the secondary airflow into the strut conduit, the SAS feed pipe having a sonic orifice therein between the inlet and the outlet thereof.

2. The SAS as defined in claim 1, wherein the SAS feed pipe includes two or more SAS feed pipes each receiving the secondary airflow from the source of secondary air and respectively defining therein a secondary air stream flowing in parallel, and each of the SAS feed pipes includes one of said sonic orifice therein between the inlet and the outlet thereof.

3. The SAS as defined in claim 2, wherein the strut inlet of each of the two or more hollow struts is in fluid flow communication with the outlet of a respective one of the two or more SAS feed pipes.

4. The SAS as defined in claim 1, wherein the sonic orifice is shaped to create a first flow restriction in the SAS feed pipe when the aircraft engine is operating at a first power running regime, and the sonic orifice is shaped to create a second flow restriction in the SAS feed pipe when the aircraft engine is operating at a second power running regime, the second power running regime being less than the first power running regime, and the second flow restriction being less than the first flow restriction.

5. The SAS as defined in claim 1, wherein the sonic orifices includes a converging-diverging nozzle.

6. The SAS as defined in claim 5, wherein the converging-diverging nozzle includes a converging inlet portion, a diverging outlet portion and a throat between the converging inlet portion and the diverging outlet portion, the converging inlet portion having a shorter axial length than the diverging outlet portion.

7. The SAS as defined in claim 1, wherein the buffer cavity is located radially inwardly of the main gas path.

8. The SAS as defined in claim 7, wherein the outlet of the SAS feed pipe is located radially outwardly of the main gas path.

9. The SAS as defined in claim 1, wherein the SAS feed pipe includes a flexible hose portion at an upstream end thereof and a rigid pipe portion at a downstream end thereof, the sonic orifice located in the rigid pipe portion.

10. The SAS as defined in claim 1, wherein the buffer cavity is in fluid communication with one or more bearing cavities and/or seals within the engine core, to feed secondary air from the buffer cavity to the one or more bearing cavities and/or seals within the engine core.

11. The SAS as defined in claim 1, wherein the aircraft engine is a turbofan gas turbine engine, and the source of secondary air includes bypass duct air from a bypass duct of the turbofan gas turbine engine.

12. The SAS as defined in claim 11, wherein a bypass air cooler (BAC) is located within the bypass duct and provides the source of secondary air for the SAS.

13. The SAS as defined in claim 2, further comprising a flow splitter having an inlet in fluid flow communication with the source of secondary air and at least two flow splitter outlets, each of the two outlets being in fluid flow communication with a respective one of the inlets of the two or more SAS feed pipes.

14. The SAS as defined in claim 2, wherein the inlet of each of the two or more SAS feed pipes is in fluid flow communication with the source of secondary air.

15. The SAS as defined in claim 2, wherein two secondary airstreams flow in parallel through the two or more SAS feed pipes being respectively fed from the source of secondary air.

16. A method of operating an aircraft engine having a secondary air system (SAS), the method comprising: receiving a secondary airflow from a source provided by the aircraft engine, the secondary airflow including one or more air streams flowing downstream of the source; flowing each of the one or more secondary air streams through a respective SAS feed pipe and into a respective hollow strut extending radially through a main gas path of an engine core of the aircraft engine; flowing the one or more secondary air streams from the respective hollow strut into a buffer cavity for feeding the secondary airflow to the engine core, the buffer cavity formed by a plenum axially aligned with the hollow strut, the buffer cavity extending partially circumferentially around the central axis from a first end positioned at a strut outlet of the respective hollow strut to a second end positioned at a strut outlet of a second respective hollow strut circumferentially offset from the first end, within an inter-compressor case of the aircraft engine case to provide circumferential flow of the secondary airflow downstream of an outlet of the respective hollow strut, a portion of a circumference of the inter-compressor case being devoid of the buffer cavity; and generating a first flow restriction in each of the secondary air streams during a first power regime of the aircraft engine, and generating a second flow restriction in the secondary air streams during a second power regime of the engine, the second power regime being lower than the first power regime, and the second flow restriction being less than the first flow restriction.

17. The method as defined in claim 16, wherein the generating includes using sonic orifices located in each said SAS feed pipe.

* * * * *